US012676327B2

(12) United States Patent
Bosch et al.

(10) Patent No.: US 12,676,327 B2
(45) Date of Patent: Jul. 7, 2026

(54) METHOD FOR OPERATING A FUEL CELL SYSTEM, AND CONTROL DEVICE

(71) Applicant: Robert Bosch GmbH, Stuttgart (DE)

(72) Inventors: Timo Bosch, Renningen (DE); Tobias Falkenau, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 490 days.

(21) Appl. No.: 18/554,704

(22) PCT Filed: Apr. 12, 2022

(86) PCT No.: PCT/EP2022/059749
§ 371 (c)(1),
(2) Date: Oct. 10, 2023

(87) PCT Pub. No.: WO2022/223371
PCT Pub. Date: Oct. 27, 2022

(65) Prior Publication Data
US 2025/0105319 A1     Mar. 27, 2025

(30) Foreign Application Priority Data

Apr. 22, 2021     (DE) ..................... 10 2021 204 028.4

(51) Int. Cl.
*H01M 8/04119*          (2016.01)
*H01M 8/04089*          (2016.01)
(Continued)

(52) U.S. Cl.
CPC ...  *H01M 8/04179* (2013.01); *H01M 8/04097* (2013.01); *H01M 8/04164* (2013.01);
(Continued)

(58) Field of Classification Search
CPC ...................... H01M 8/04179; H01M 8/04164
See application file for complete search history.

(56) References Cited

U.S. PATENT DOCUMENTS

2007/0196709  A1     8/2007   Umayahara et al.

FOREIGN PATENT DOCUMENTS

CN          110010932  A        7/2019
DE       102019206579  A1      11/2020
(Continued)

OTHER PUBLICATIONS

International Search Report and Written Opinion for Application No. PCT/EP2022/059749 dated Aug. 10, 2022 (2 pages).

*Primary Examiner* — Stephan J Essex
(74) *Attorney, Agent, or Firm* — Michael Best & Friedrich LLP

(57)          ABSTRACT

The invention relates to a method for operating a fuel cell system, wherein hydrogen from a tank and recirculated hydrogen are fed as anode gas to at least one fuel cell via an anode circuit (1), and water (6) contained in the anode gas is separated by means of a water separator (2) integrated into the anode circuit (1), is collected in a container (3), and is removed from the system by intermittently opening a drain valve (4). According to the invention, the following steps are carried out to detect whether the container (3) is full:

opening a purge valve (5) on the container (3),
  acquiring the point in time of a sudden change in the opening cross-section of a hydrogen metering valve integrated into the anode circuit (1) to maintain a set pressure in the anode circuit (1), and
  comparing said point in time with the point in time the purge valve (5) opened.

The invention further relates to a control device for carrying out the method or individual method steps.

8 Claims, 2 Drawing Sheets

(51) Int. Cl.
    *H01M 8/04537*     (2016.01)
    *H01M 8/04746*     (2016.01)
    *H01M 8/04828*     (2016.01)

(52) U.S. Cl.
    CPC ... *H01M 8/04597* (2013.01); *H01M 8/04753*
             (2013.01); *H01M 8/04843* (2013.01)

(56)                References Cited

FOREIGN PATENT DOCUMENTS

| JP | 2007053070 A | 3/2007 |
|----|--------------|--------|
| JP | 2007066591 A | 3/2007 |
| JP | 2008235051 A | 10/2008 |
| KR | 20200042278 A | 4/2020 |

METHOD FOR OPERATING A FUEL CELL SYSTEM, AND CONTROL DEVICE

BACKGROUND

The invention relates to a method for operating a fuel cell system, in particular a polymer electrolyte membrane (PEM) fuel cell system. Furthermore, the invention relates to a control device configured so as to carry out steps of the method.

A PEM fuel cell comprises a polymer electrolyte membrane arranged between an anode and a cathode. Using the PEM fuel cell, hydrogen fed to the anode and oxygen fed in the form of air to the cathode can be converted into electrical energy, heat, and water. In practical application, a plurality of fuel cells are gathered together to form a fuel cell stack, also known as a "stack," in order to increase the generated electric voltage.

Because anode gas exiting from a PEM fuel cell typically contains still unused hydrogen, it is recirculated and re-fed to the anode via an anode circuit. Over time, however, the recirculated anode gas is enriched with nitrogen that diffuses from the cathode side to the anode side. Thus, in order to ensure that sufficient hydrogen is supplied to the fuel cell, the anode region must be purged from time to time. For this purpose, a valve, the so-called purge valve, is opened, via which anode gas is discharged. Furthermore, a hydrogen metering valve is opened in order to replace the discharged amount with fresh hydrogen from a tank. In this way, not only the supply of hydrogen to the fuel cell is ensured, but at the same time the gas pressure in the anode circuit is kept at a specified set pressure.

Moreover, the water generated by the electrochemical reaction in the fuel cell must be removed from the anode gas. For this purpose, a water separator is integrated into the anode circuit, with a container in which the deposited water is collected. Depending on the fill level in the container, a further valve, the so-called drain valve, is opened and the container is emptied. In order to detect when the container needs to be emptied, the fill level in the container can be monitored by means of a fill level sensor. In mobile applications, however, this level sensor is subject to fluctuations and/or vibrations that can affect the measurement result, such that the use of a fill level sensor is problematic. Moreover, the fill level sensor increases costs.

SUMMARY

The present invention therefore addresses the problem of providing a method for operating a fuel cell system that allows for a reliable and at the same time inexpensive monitoring of the fill level in a container for collecting separated water without a fill level sensor.

In order to solve this problem, the method having the features of the disclosure is proposed. In addition, a control device for carrying out the method or individual method steps is specified.

In the proposed method of operating a fuel cell system, in order to operate a fuel cell system, hydrogen from a tank as well as recirculated hydrogen is fed as anode gas to at least one fuel cell via an anode circuit. In the method, water contained in the anode gas is further separated with the aid of a water separator integrated into the anode circuit, collected in a container, and removed from the system by temporarily opening a drain valve. To detect whether the container is full, the following steps are carried out according to the invention:

opening a purge valve on the container, acquiring the point in time of a sudden change in the opening cross-section of a hydrogen metering valve integrated into the anode circuit to maintain a set pressure in the anode circuit, and comparing said point in time with the point in time the purge valve opened.

When the tank is full or the water level lies above the connection site of the purge valve, water instead of gas initially exits upon opening of the purge valve. The set pressure in the anode circuit hardly changes, so that the opening cross-section of the hydrogen metering valve remains substantially the same. Only when gas is discharged via the purge valve instead of water does the opened hydrogen metering valve need to be opened further in order to maintain the set pressure. This occurs suddenly and can therefore be used as a clear indication that gas is now exiting. The temporal offset between the opening of the purge valve and the change of the opening cross-section of the hydrogen metering valve thus indicates a full container. The maximum fill level is thereby specified by the vertical position of the purge valve.

As long as only water and no gas is discharged from the container via the purge valve, no hydrogen must be fed, despite the water column becoming smaller. This is because the discharge of water has only a minor effect on the set pressure in the anode circuit.

In the further development of the invention, it is proposed that, in order to detect the point in time of a sudden change in the opening cross-section of the hydrogen metering valve, the actuator current for actuating the hydrogen metering valve is evaluated. The actuator flow is proportional to the degree of opening of the hydrogen metering valve or the hydrogen flow rate metered in. The actuator current thus represents the variable for adjusting the set pressure in the anode circuit.

In order to evaluate the actuator current, a control unit of the fuel cell system is preferably used, with the aid of which the hydrogen metering valve is actuated. When opening the purge valve, if anode gas is immediately discharged, the hydrogen metering valve must be actuated with a comparatively high electrical current in order to maintain the set pressure in the anode circuit. If water initially exists upon opening of the purge valve, the hydrogen metering valve must only intervene a little, if at all, in order to get the increased volume of the anode circuit to the set pressure. The changed actuator current can be acquired precisely and at a high measurement frequency with the aid of the control unit. The evaluation is preferably carried out using a suitable algorithm, which can be stored in the control unit.

Depending on the evaluation of the actuator current, the drain valve can then be actuated. In particular, upon detecting that the container is full, the drain valve can be opened. The control of the drain valve is preferably also carried out with the aid of the control unit. The method can be fully automated in this manner.

Furthermore, it is proposed that signals that are used as the basis for the evaluation of the actuator current are previously subjected to a filtering and/or averaged over time. In this way, the accuracy of the evaluation can be increased.

Preferably, a debouncing time of the purge valve is considered in the evaluation of the actuator current. That is to say, a certain temporal offset between actuation and opening of the purge valve is considered in the evaluation. In this way, the accuracy of the evaluation can be further increased.

Furthermore, a load change occurring with the purge valve open is preferably considered in the evaluation of the actuator current. This can result in a changed actuation of the hydrogen metering valve, so that the actuator current changes.

In addition, a control device that is configured so as to carry out steps of the method according to the invention is proposed. In particular, the actuator current required to actuate the hydrogen metering valve can be acquired and evaluated using the control valve. If the evaluation results in a temporally offset increase in actuator current after opening of the purge valve, this indicates a full container. In this case, the control device can be used in order to actuate and open the drain valve so as to empty the container. To evaluate the actuator current, a corresponding algorithm is preferably stored in the control unit.

BRIEF DESCRIPTION OF THE DRAWINGS

The invention and its advantages will be explained in further detail in the following with reference to the accompanying drawings. Shown are.

DETAILED DESCRIPTION

Figure 1:
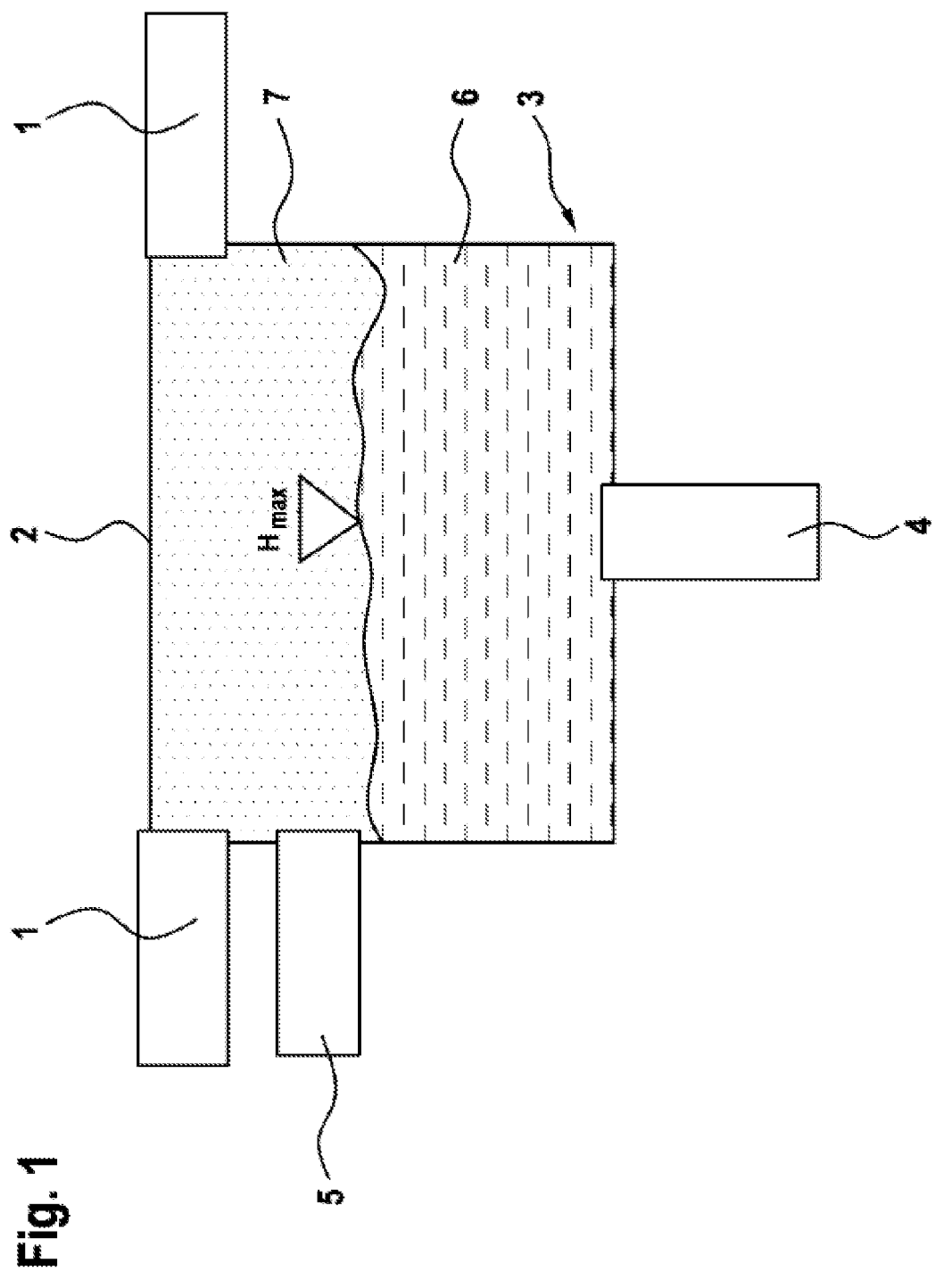
FIG. 1 a schematic illustration of a water separator integrated into an anode circuit of a fuel cell system.

FIG. 1 shows, by way of example, a water separator 2 integrated in an anode circuit 1. The water separator 2 comprises a container 3 for collecting water 6, which is separated from the anode gas of the anode circuit 1 by means of the water separator 2. To empty the container 3, a drain valve 4 is provided on the floor-side. This is opened depending on the fill level of the container 3. Furthermore, a purge valve 5 is provided on the side of the container 3. Via this purge valve, anode gas enriched with nitrogen can be removed from the anode circuit 1. However, this presupposes that the fill level in the container 3 is not so high that the purge valve 5 lies below the water level. Otherwise, with the opening of the purge valve 5, water 6 and not gas 7 will escape. The water 6 exits until the fill level $H_{max}$ is reached. This is dictated by the vertical position of the purge valve 5 on the container 3.

Figure 2:
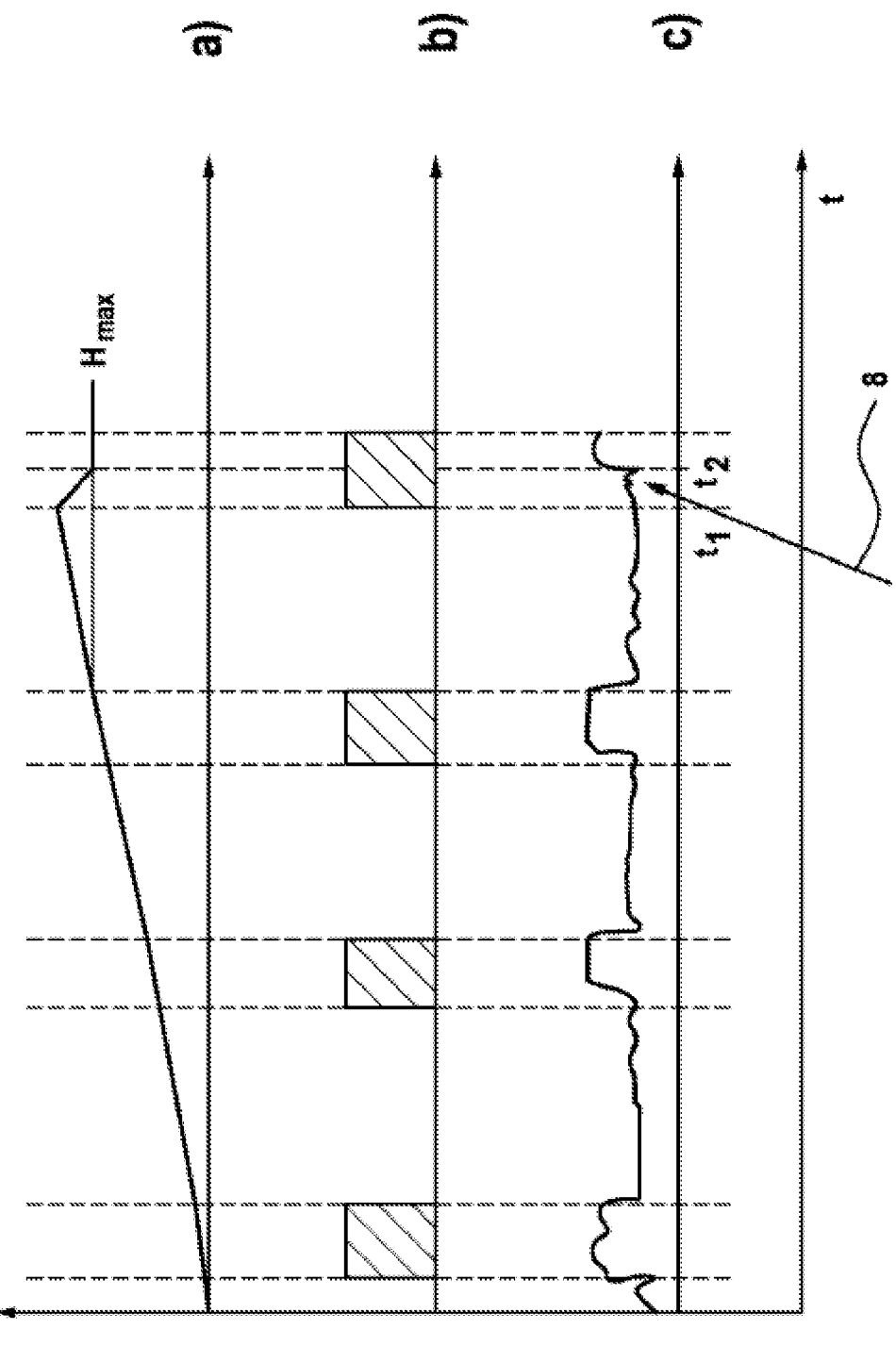
FIG. 2 a graph illustrating the actuator flow path as a function of the fill level in the tank of the water separator.

Gas 7 exiting the container 3 upon opening of the purge valve 5 is replaced with fresh hydrogen. This is metered into the anode circuit using a hydrogen metering valve (not shown). The hydrogen metering valve or an actuator (not shown) of the hydrogen metering valve is actuated accordingly via a control unit (not shown). Accordingly, the opening the purge valve 5 is accompanied by an increase in the actuator current. This relationship is illustrated by way of example in FIG. 2, wherein the middle diagram b) indicates the opening and closing of the purge valve 5 over time t, and the bottom diagram c) shows the associated actuator flow path. Note that the last time the purge valve 5 is opened, the increase in the actuator current is significantly delayed (see arrow 8). This is due to the fact that the container 3 has filled with water over time, so that the fill level at the point in time $t_1$ of opening of the purge valve 5 was above $H_{max}$. That is to say, with the opening of the purge valve 5 at time $t_1$, only water 6 has initially escaped from the container 3. Only when the fill level has fallen so far that gas is discharged does the actuator current also increase. This is the case at the point in time $t_2$. The temporal offset between $t_1$ and $t_2$ thus indicates that the container 3 is full and should be emptied by opening the drain valve 4.

The invention claimed is:

1. A method for operating a fuel cell system, wherein hydrogen from a tank and recirculated hydrogen are fed as anode gas to at least one fuel cell via an anode circuit (1), and water (6) contained in the anode gas is separated by means of a water separator (2) integrated into the anode circuit (1), is collected in a container (3), and is removed from the system by intermittently opening a drain valve (4), wherein the following steps are carried out to detect whether the container (3) is full:

opening a purge valve (5) on the container (3),
acquiring a point in time ($t_2$) of a sudden change in the opening cross-section of a hydrogen metering valve integrated into the anode circuit (1) to maintain a set pressure in the anode circuit (1), and
comparing said point in time ($t_2$) with a point in time ($t_1$) the purge valve (5) opened.

2. The method according to claim 1, wherein, in order to detect the point in time ($t_2$) of a sudden change in the opening cross-section of the hydrogen metering valve, the actuator current for actuating the hydrogen metering valve is evaluated.

3. The method according to claim 1, wherein, in order to evaluate the actuator current, a control unit of the fuel cell system is used with the aid of which the hydrogen metering valve is actuated.

4. The method according to claim 2, wherein, depending on the evaluation of the actuator current, the drain valve is actuated, preferably with the aid of the control unit.

5. The method according to claim 2, wherein signals that are used as the basis for the evaluation of the actuator current are previously subjected to a filtering and/or averaged over time.

6. The method according to claim 2, wherein a debouncing time of the purge valve (5) is considered in the evaluation of the actuator current.

7. The method according to claim 2, wherein a load change occurring with the purge valve (5) open is considered in the evaluation of the actuator current.

8. A control unit for a fuel cell system, wherein hydrogen from a tank and recirculated hydrogen are fed as anode gas to at least one fuel cell via an anode circuit (1), and water (6) contained in the anode gas is separated by means of a water separator (2) integrated into the anode circuit (1), is collected in a container (3), and is removed from the system by intermittently opening a drain valve (4) wherein the control unit is configured to:

control opening a purge valve (5) on the container (3),
acquire a point in time ($t_2$) of a sudden change in the opening cross-section of a hydrogen metering valve integrated into the anode circuit (1) to maintain a set pressure in the anode circuit (1), and
compare said point in time ($t_2$) with a point in time ($t_1$) the purge valve (5) opened.

* * * * *